US007812758B2

United States Patent
Morris (10) Patent No.: US 7,812,758 B2
(45) Date of Patent: Oct. 12, 2010

(54) SYNTHETIC APERTURE RADAR (SAR) IMAGING SYSTEM

(75) Inventor: James Richard Morris, Reston, VA (US)

(73) Assignee: Northrop Grumman Space and Mission Systems Corporation, Los Angeles, CA (US)

(*) Notice: Subject to any disclaimer, the term of this patent is extended or adjusted under 35 U.S.C. 154(b) by 498 days.

(21) Appl. No.: 11/945,952

(22) Filed: Nov. 27, 2007

(65) Prior Publication Data

US 2010/0039313 A1 Feb. 18, 2010

(51) Int. Cl.
*G01S 13/90* (2006.01)
(52) U.S. Cl. .................. 342/25 A; 342/25 F; 342/57
(58) Field of Classification Search .......... 342/25 R, 342/25 A–25 F, 57, 195
See application file for complete search history.

(56) References Cited

U.S. PATENT DOCUMENTS

| | | | | |
|---|---|---|---|---|
| 3,588,895 | A * | 6/1971 | Goggins, Jr. et al. | 342/25 A |
| 3,603,992 | A * | 9/1971 | Goggins et al. | 342/25 B |
| 4,733,238 | A | 3/1988 | Fiden | |
| 5,321,409 | A | 6/1994 | Walker | |
| 5,469,167 | A * | 11/1995 | Polge et al. | 342/25 A |
| 5,495,248 | A * | 2/1996 | Kawase et al. | 342/25 A |
| 5,999,119 | A | 12/1999 | Carnes et al. | |
| 6,597,304 | B2 * | 7/2003 | Fienup | 342/25 R |
| 6,750,809 | B1 * | 6/2004 | Cho et al. | 342/129 |
| 6,763,058 | B1 | 7/2004 | Morris | |
| 6,870,501 | B2 | 3/2005 | Beard | |
| 7,205,930 | B2 | 4/2007 | Ho et al. | |
| 7,277,045 | B2 | 10/2007 | Budic | |
| 2006/0164288 | A1 * | 7/2006 | Voelker | 342/25 A |
| 2006/0202885 | A1 | 9/2006 | Chen | |
| 2010/0039313 | A1 * | 2/2010 | Morris | 342/25 F |

OTHER PUBLICATIONS

"A single-channel SAR-GMTI algorithm based on sub-apertures and FrFT", Proceedings of the SPIE—The International Society for Optical Engineering, 2007, vol. 6795, p. 67951Y-1-6, Shujun-Liu, Yunneng-Yuan, Jun-Wei, Shiyi-Mao.*

* cited by examiner

*Primary Examiner*—John B Sotomayor
(74) *Attorney, Agent, or Firm*—Tarolli, Sundheim, Covell & Tummino LLP (57) ABSTRACT

One embodiment of the invention includes a synthetic aperture radar (SAR) system. The system comprises a radar transmitter configured to transmit a combined signal, the combined signal comprising a first signal that is a modulated SAR radar signal and a second signal that is a modulated signal. The system also comprises at least one radar receiver configured to receive a reflected combined signal that comprises a reflected first signal and a reflected second signal, and to demodulate the reflected first and second signals. The reflected first and second signals can correspond to the first and second signals having been reflected from a target. The system further comprises a radar image processor configured to generate a radar image of the target based on signal parameters associated with the reflected first signal and based on information comprised within the reflected second signal.

22 Claims, 5 Drawing Sheets

SYNTHETIC APERTURE RADAR (SAR) IMAGING SYSTEM

TECHNICAL FIELD

The present invention relates generally to radar systems, and specifically to a synthetic aperture radar (SAR) imaging system.

BACKGROUND

Since the early 20$^{th}$ century, experimentation has been conducted with radio waves as a means to detect distant targets of interest. Radar systems have developed from simple detection and ranging systems to essential systems on board aircraft and ships, and more recently to highly sophisticated space surveillance and imaging systems. Radar technology has followed, and in many cases driven, the advances in high-frequency electronic systems, digital processing, and computing. Most radar systems employ distinct but collocated transmitter and receiver electronics, as is explained in elementary radar systems textbooks. A modern aircraft or ship may have multiple radar systems of this type, for detecting and ranging airborne vehicles, marine vessels, and/or weather phenomena. The development of bistatic radar systems, such that the radar transmitter and radar receiver are not collocated, has attracted some attention. Early use of radio wave detection of aircraft, for example, has included the implementation of bistatic reflections of a radio broadcast from a stationary transmitter to a distant receiver as a means to indicate the presence of a reflective target.

As radar technology has improved, radar based systems have been designed and implemented to provide critical imaging information regarding a target object or target area, particularly in scenarios where visible detection or visible images are not available or are not satisfactory. Signal parameters such as amplitude, time-delay, carrier-frequency, and modulation type are known to affect the performance of simple radar systems and advanced radar based imagery systems using synthetic aperture radar (SAR) techniques. In SAR systems, the motion of the platform hosting the radar transmitter is used to synthesize a much larger antenna aperture, consequently resulting in a higher resolution than is possible with the smaller physical aperture used in typical radar systems. The characteristics or parameters of radar signals that are reflected from a target object can be employed to provide imagery of the target. Because these images are generated from radio frequency (RF) waveforms as opposed to visible light, radar images can typically be obtained in poor weather or when the target is obscured by foliage, fog, or cloud cover.

In basic terms, SAR systems employ modulated pulse Doppler radar signals. Reflected signals from suitable radio-wave reflective targets can be processed to create a radar image that can often be distinct from an image obtained from a visible light based system. A SAR system typically uses the monostatic return from a target, which requires the radar receiver to be collocated, or nearly collocated, with the radar transmitter. As such, the SAR system can be located on a single platform in motion, such as an aircraft or orbiting satellite. In a bistatic or multistatic radar systems, the radar transmitter and the one or more radar receivers can be significantly separated in space, such that they can be located on separate and distinct platforms.

Important to the function of bistatic and multistatic systems is the variation in the target radar cross section (RCS) when computed for electromagnetic scattering at angles other than that obtained in monostatic radar systems. RCS is a parameter that characterizes the relative strength of the radar backscatter signal, and is a complex function of radio wave frequency, target geometry, electromagnetic scattering principles, and physical composition. As an example, objects with low RCS in a monostatic radar system often have high RCS when viewed as a bistatic or multistatic target by a radar receiver displaced by some significant angle with respect to the radar illumination.

The performance of typical SAR systems can be characterized by examining an ambiguity function of the transmitted radar signal. The ambiguity function of the radar signal is related to the autocorrelation of the signal as a function of system parameters, time delay, and Doppler frequency shift. Ideally, the ambiguity function can be plotted as a narrow spike centered at the origin, with limited energy content along both the time and Doppler axis. Errors in interpreting the radar signal parameters in the pulsed radar signals, as reflected from the target object or terrain, can result in artifacts and degraded resolution that can affect the processed radar image. Radar signals, including linear frequency modulated (FM) chirp pulse trains employed in SAR systems, may have limited bandwidth and time duration, such that the fundamental radar system performance can be compromised. The critical parameter of time-bandwidth product (TW) for a linear frequency modulated chirp is constrained by radar system design factors, such as ambiguous range, peak pulse power, and coherent bandwidth of the RF electronics. Accordingly, radar images may be generated without significant clarity or resolution.

SUMMARY

One embodiment of the invention includes a synthetic aperture radar (SAR) system. The system comprises a radar transmitter configured to transmit a combined signal, the combined signal comprising a first signal that is a modulated SAR radar signal and a second signal that is a modulated signal. The system also comprises at least one radar receiver configured to receive a reflected combined signal that comprises a reflected first signal and a reflected second signal, and to demodulate the reflected first and second signals. The reflected first and second signals can correspond to the first and second signals having been reflected from a target. The system further comprises a radar image processor configured to generate a radar image of the target based on signal parameters associated with the reflected first signal and based on information comprised within the reflected second signal.

Another embodiment of the invention includes a method for generating a radar image of a target in a SAR system. The method comprises transmitting a combined signal from a transmitter to the target. The combined signal can comprise a first signal that is a modulated SAR radar signal and a second signal that is a spread-spectrum modulated signal. The method also comprises receiving a reflected combined signal at each of at least one radar receiver, the reflected combined signal comprising a reflected first signal and a reflected second signal. The reflected first and second signals corresponding to the first and second signals having been reflected from the target. The method further comprises demodulating the first and second signals at the at least one radar receiver and generating a radar image of the target based on signal parameters associated with the first signal and based on information comprised within the second signal.

Another embodiment of the invention includes a SAR system. The system comprises means for generating a first signal that is a modulated SAR radar signal and means for generating a second signal that is a spread-spectrum modulated signal. The second signal can be orthogonal to the first signal. The system also comprises means for amplifying the first signal to a first power level, means for amplifying the second signal to a second power level that is substantially less than the first power level, and means for transmitting a combined signal comprising the first and second signals. The system also comprises means for receiving a reflected first signal and a reflected second signal. The reflected first and second signals corresponding to the first and second signals having been reflected from a target. The system also comprises means for demodulating the reflected first signal and means for demodulating the reflected second signal. The system further comprises means for processing a phase-history of the reflected first signal based on signal parameters associated with the first signal and based on information comprised within the second signal, and means for generating a radar image of the target based on the phase-history of the reflected first signal.

DETAILED DESCRIPTION

The present invention relates generally to radar systems, and specifically to a synthetic aperture radar (SAR) imaging system. The SAR imaging system can be vehicle-based, such that the SAR transmitter and one or more SAR receivers can be located on satellites or aircraft. The SAR imaging system can be bistatic, such that the radar transmitter and the radar receiver are not collocated, such as by each being located on a separate vehicle or in disparate geographical locations, or multistatic, such that the radar transmitter and multiple radar receivers are not collocated. Therefore, in a military context, the SAR imaging system may be difficult to jam or defeat by physical countermeasures by adversarial parties, and may be able to provide clearer or unique radar images based on radar information collected at multiple radar receivers.

The radar transmitter can transmit a combination or composite signal that includes a legacy linear frequency-modulated (FM) radar signal and a low-level phase-coded high time bandwidth product signal at a target to be imaged. The combination can occur based on adding the signals together subsequent to amplification. As such, the radar receiver(s) can receive versions of the radar signal and the coded signal that are reflected from the target to be imaged. The coded signal can include a timing sequence that is time-aligned with the transmission of the radar signal. Upon receiving the reflected radar signal and reflected coded signal, the radar receiver(s) can demodulate both the radar signal and the coded signal to obtain a phase-history of the radar signal based on amplitude, time-of-arrival, and Doppler-shift of the radar signal. The timing sequence of the coded signal can be compared with a reference signal having a substantially identical timing sequence, such that an effective time-bandwidth product (TW) of the composite radar signal can be significantly increased. Specifically, time and frequency information associated with both signals can be more precisely obtained based on the timing information contained within the coded signal relative to the reference signal. Accordingly, the time-of-arrival information and the Doppler-shift information of the radar signal can be significantly more accurate, resulting in a redefined radar image of the target. The redefined radar image quality can thus accomplished without incorporating cross-links or other communications between the multiple platforms. As an example, the redefined radar image can be achieved without requiring Global Positioning System derived timing or position information.

The FM chirp radar signal and the phase coded signal can be in phase quadrature relative to each other, and the radar signal can be transmitted at a significantly greater power level than the coded signal. In addition, the coded signal can be spread-spectrum modulated with a long epoch pseudo-noise (PN) code. The power level of the FM chirp radar signal thus substantially masks the phase coded signal, and separate receiving and demodulation equipment, as well as the reference PN code solution, is needed to interpret both of the signals. As a result, it can be very difficult to obtain the collective imaging information of the signals by an adversarial party, thus providing enhanced security of the imaging information. Furthermore, field communications data can be encoded in one or both of the radar signal and the coded signal, such that the enhanced security of the signals can be extended to radio frequency (RF) communication of the communications data to one or more separate field receivers.

Figure 1:
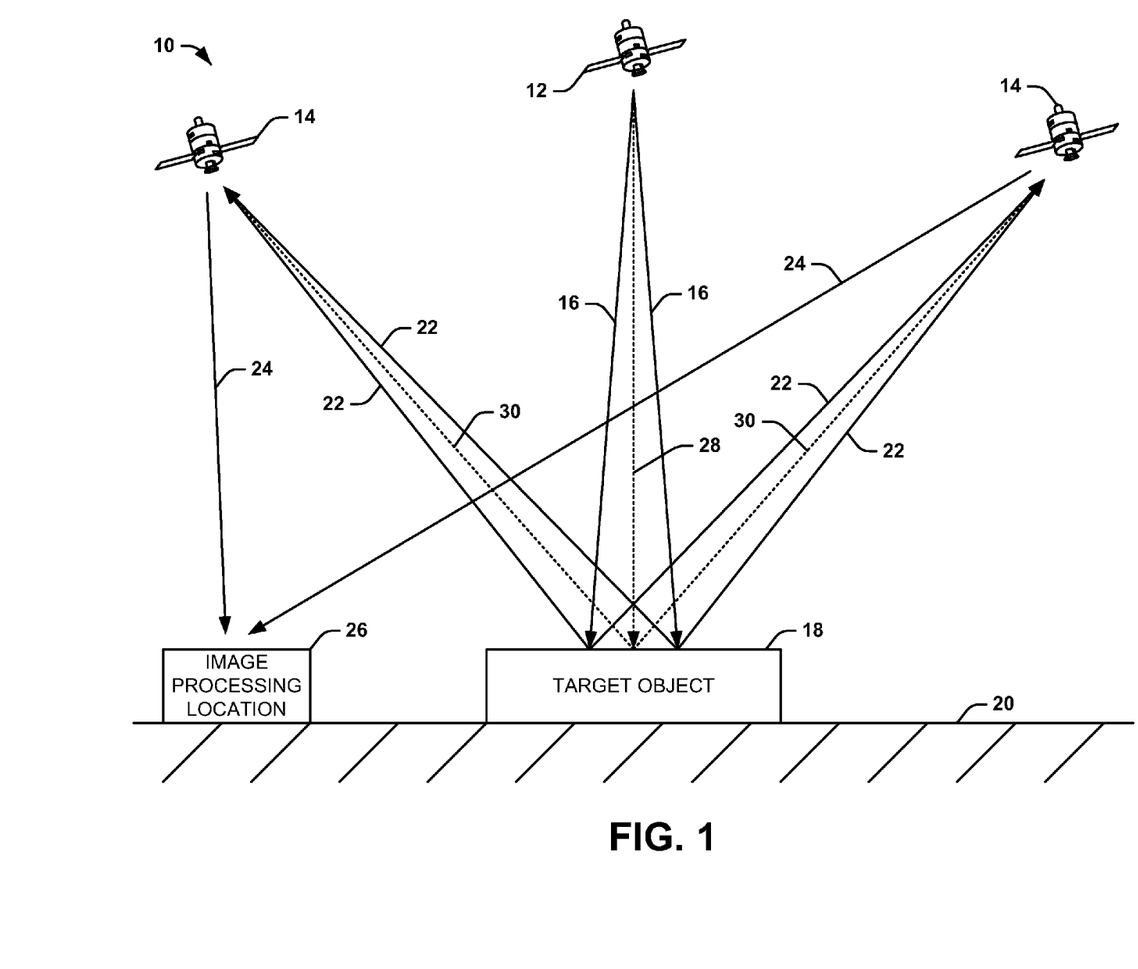
FIG. 1 illustrates an example of a radar system in accordance with an aspect of the invention.

FIG. 1 illustrates an example of a radar system 10 in accordance with an aspect of the invention. The radar system 10 is demonstrated in the example of FIG. 1 as a satellite radar system including a satellite 12 that includes a radar transmitter and two satellites 14 that each include a radar receiver. Because the radar receivers of the radar system 10 are located on satellites 14, are not collocated with the radar transmitter on the satellite 12, the radar system 10 is configured as a multistatic radar system. It is to be understood, however, that the radar system 10 is not limited to being multistatic, but could also be implemented as a bistatic radar system, or even as a monostatic radar system. In addition, the radar system 10 can include any number of additional radar transmitters and receivers mounted on additional vehicles or locations. Furthermore, the radar transmitters and receivers are not limited to location on satellites 12 and 14, respectively, but can also include surface-based locations and/or locations on other vehicles, such as aircraft or surface vehicles.

The radar system 10 can be configured as a SAR radar system. Thus, the radar transmitter in the satellite 12 can be configured to transmit a SAR pulsed signal, demonstrated in the example of FIG. 1 at 16. For example, the SAR pulsed signal 16 can be one of a class of pulse compression waveforms, such as a linear frequency modulated (FM) radar chirp signal. The SAR pulsed signal 16 is transmitted to a target object 18 located on a planetary surface 20, which could be the surface of Earth or any of a variety of other celestial bodies. As an example, the target object 18 can be a terrain feature or area, a city, an area thought to contain enemy defenses, or any of a variety of other objects. The SAR pulsed signal 16 is reflected from the target object 18 as a reflected SAR pulsed signal 22, which is thus received by the radar receivers on the satellites 14. The radar receivers can thus each evaluate signal parameters, such as amplitude, time-of-arrival (i.e., time delay from transmission), and/or Doppler-shift associated with the reflected SAR pulsed signal 22 relative to the SAR pulsed signal 16.

As an example, the radar receivers in the satellites 14 can implement the signal parameters of the reflected SAR pulsed signal 22 to generate a phase-history of the reflected SAR pulsed signal 22, as described in greater detail below. The phase-history of the reflected SAR pulsed signal 22 can thus be representative of characteristics of the target object 18, such as geometry, cross sectional area, and material reflective properties. Therefore, the phase-history of the reflected SAR pulsed signal 22 can be employed to generate the radar image of the target object 18. The radar image can be generated at one or more of the radar receivers on the satellites 14. Alternatively, as demonstrated in the example of FIG. 1, the satellites 14 can transmit the phase-history of the reflected SAR pulsed signal 22 via respective downlinks 24 to an image processing location 26. The image processing location 26 can thus include a radar image processor (not shown) that can construct the radar image of the target object 18 based on the phase-histories of the reflected SAR pulsed signal 22. As an example, the radar image processor can be a legacy radar image processor that is augmented with hardware and software capable of generating a more detailed radar image, as described below. It is to be understood that the image processing location 26 need not be surface-based, as demonstrated in the example of FIG. 1, but could be located on or in another vehicle, such as another satellite or aircraft.

In addition to transmitting the SAR pulsed signal 16, the radar transmitter on the satellite 12 can also be configured to concurrently transmit a coded signal 28. As an example, the coded signal 28 can be a phase-coded signal. The SAR pulsed signal 16 and the coded signal 28 are thus transmitted as a combination signal, such that they can be added together in the radar transmitter on the satellite 12 prior to transmission from the same antenna. The coded signal 28 can be a signal that is separately modulated from the SAR pulsed signal 16. As an example, the coded signal 28 can be spread-spectrum modulated, and can include a pseudo-noise (PN) code. The PN code of the coded signal 28 can include a timing sequence that can be time-aligned with the SAR pulsed signal 16. As an example, the SAR pulsed signal 16 can include a sequential code that corresponds to a transmission sequence of the SAR pulsed signal 16. Therefore, prior to transmitting the SAR pulsed signal 16 and the coded signal 28, the timing sequence of the coded signal 28 can be aligned with the sequential code of the SAR pulsed signal 16. Specifically, the epoch of the timing signal can be aligned with the sequential code, such that the first symbol of the timing sequence of the coded signal 28 can be transmitted concurrently with the first symbol of the sequential code of the SAR pulsed signal 16, followed by the second of each, and so forth.

Because the SAR pulsed signal 16 and the coded signal 28 are transmitted as a combination or composite signal, the coded signal 28 is likewise reflected from the target object 18 as reflected coded signals 30. The reflected coded signals 30 are received at the radar receivers at the satellites 14, similar to the reflected SAR pulsed signal 22. Therefore, the radar receivers can concurrently and independently demodulate and process both the reflected SAR pulsed signal 22 and the reflected coded signals 30. As a result, the radar receivers can generate the phase-history of the reflected SAR pulsed signal 22 based on the signal parameters of the reflected SAR pulsed signal 22 and the timing sequence within the reflected coded signals 30. Accordingly, the time-alignment of the timing sequence of the reflected coded signals 30 with the reflected SAR pulsed signal 22 results in a substantial increase in both time-of-arrival resolution and precision Doppler frequency resolution (e.g., time of transmission versus time-of-arrival). Therefore, a clearer image of the target object 18 can be generated by the radar image processor at the image processing location 26.

Because the SAR pulsed signal 16 and the coded signal 28 are separately modulated, the radar system 10 can benefit from enhanced security in that it may be difficult for the coded signal 28 to be received and decoded by adversarial parties. As an example, the SAR pulsed signal 16 can be transmitted at a significantly higher power level within the combination signal than the coded signal 28, such that the SAR pulsed signal 16 can effectively mask the coded signal 28. As another example, the SAR pulsed signal 16 and the coded signal 28 can be transmitted orthogonally, such as in phase-quadrature, relative to each other. Thus, due to the orthogonal relationship of the SAR pulsed signal 16 and the coded signal 28, as well as the separate modulation techniques (i.e., linear FM chirp and PN coded spread-spectrum, respectively), an adversarial interceptor of the SAR pulsed signal 16 and the coded signal 28 would require separate demodulation equipment to obtain the information in the coded signal 28. Furthermore, based on the nature of the PN code, it would also be difficult for an adversarial party to decode the coded signal 28 to obtain the information contained within, such as the timing sequence based on a start of a PN code epoch. As a result, the radar system 10 benefits from enhanced security due to the mitigation of adversarial parties being able to demodulate and decode the coded signal 28 to obtain the information therein. Accordingly, the adversarial parties may be unaware of the enhanced imaging features that are afforded by the coded signal 28.

In addition to the use of the SAR pulsed signal 16 and the coded signal 28 being transmitted for radar imaging the target object 18, the SAR pulsed signal 16 and/or the coded signal 28 can also be coded with communications data for transmission of the communications data to one or more RF receivers. As an example, the downlinks 24 to the image processing location can be provided via the transmitted SAR pulsed signal 16 and/or the coded signal 28. As another example, the satellite 12 can provide command signals in the SAR pulsed signal 16 and/or the coded signal 28, such that the satellites 14 can receive the command signals encoded in the reflected SAR pulsed signal 22 and/or the reflected coded signal 30 upon receiving the reflected combination signal. Furthermore, due to the enhanced security of the radar system 10, as described above, the possibility of interception of the communications data by adversarial parties can likewise be mitigated.

Figure 2:
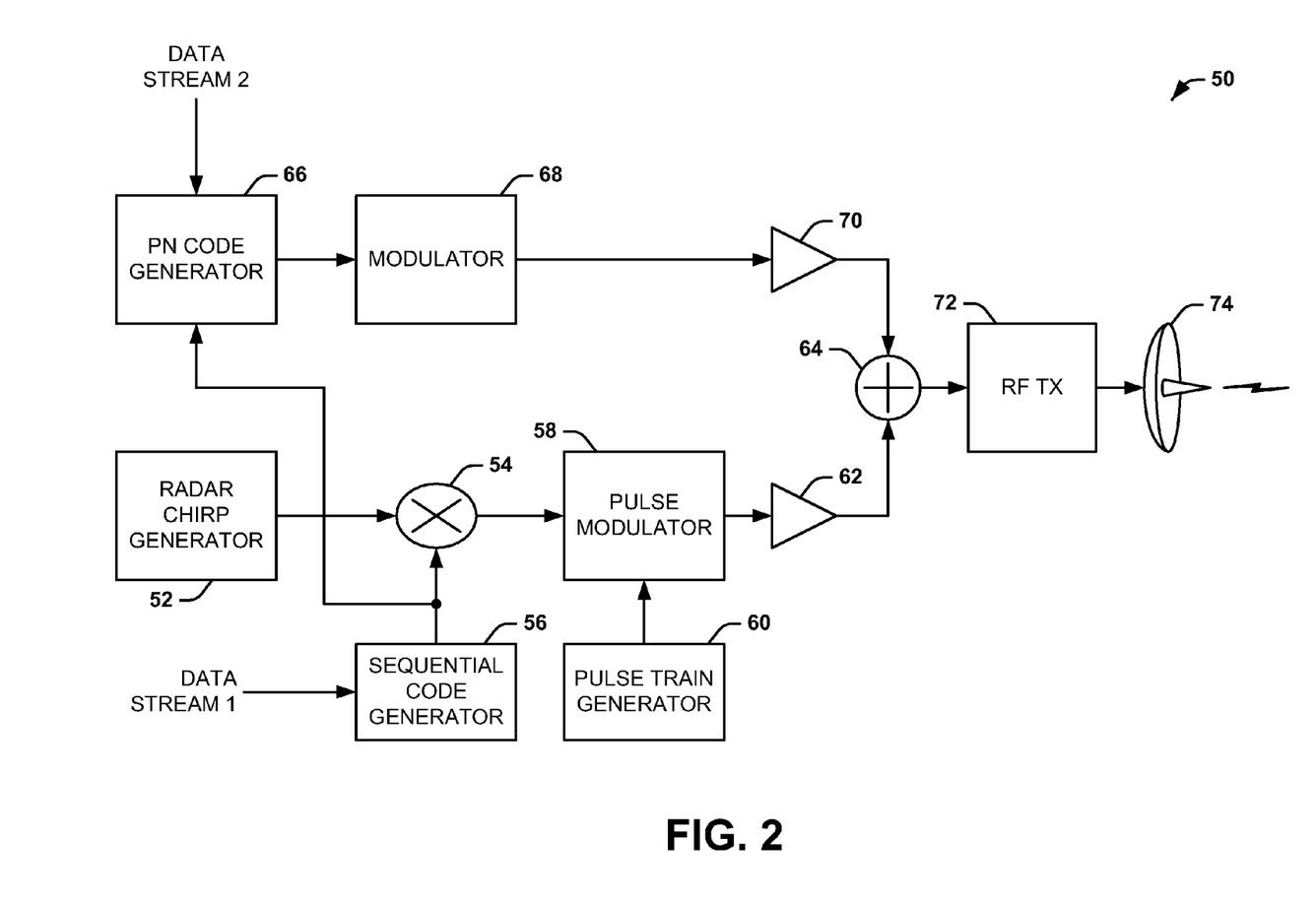
FIG. 2 illustrates an example of a synthetic aperture radar (SAR) transmission system in accordance with an aspect of the invention.

FIG. 2 illustrates an example of a SAR transmission system 50 in accordance with an aspect of the invention. The SAR transmission system 50 can be implemented in the satellite 12 in the example of FIG. 1 to transmit the combination signal that includes the SAR pulsed signal 16 and the coded signal 28. Therefore, reference will be made to the example of FIG. 1 in the following description of the example of FIG. 2.

The SAR transmission system 50 includes a radar chirp generator 52. The radar chirp generator is configured to generate the baseband radar signal with a precisely controlled chirp rate, such that frequency can be monotonically increased or decreased along the length of the radar pulse, such as by linear FM techniques. As an example, a linear FM chirp can be characterized by a chirp slope or rate, a chirp duration, and a repetition pattern. The radar chirp generator 52 provides the baseband radar signals to a mixer 54. The mixer 54 is configured to mix the baseband radar signals with a sequential code that is provided by a sequential code generator 56. The sequential code can define the transmission sequence of the radar chirp signals. As an example, the sequential code can be a predefined Barker code or other code with known autocorrelation properties. As another example, the sequential code generator 56 can receive a data stream of communications data, demonstrated in the example of FIG. 2 as DATA STREAM 1. Therefore, in addition to defining the transmission sequence of the radar chirp signals, the sequential code can also encode the communications data provided by DATA STREAM 1.

The mixer 54 provides the mixed baseband radar chirp signal and sequential code to a pulse modulator 58. A pulse train generator 60 provides an RF pulse train that can be characterized by a carrier frequency, pulse repetition rate, and duty cycle, to the pulse modulator 58. As such, the pulse modulator 58 modulates the mixed radar chirp signal and sequential code into a SAR pulsed signal. As an example, the pulse modulator 58 can also phase-modulate the SAR pulsed signal based on the sequential code that is mixed with the radar chirp signal. The SAR pulsed signal is amplified by an amplifier 62 and is provided to a summation component 64.

The SAR transmission system 50 also includes a PN code generator 66. The PN code generator 66 is configured to generate the PN code that corresponds to the timing sequence of the coded signal. The PN code generator 66 also receives an input from the sequential code generator 56. As a result, the timing sequence generated by the PN code generator 66 can be time-aligned with the sequential code generated by the sequential code generator 56. In addition, as an example, the PN code generator 66 can receive a data stream of communications data, demonstrated in the example of FIG. 2 as DATA STREAM 2. Therefore, in addition to defining the timing sequence that is aligned with the sequential code that is mixed with the radar chirp signals, the PN code can also encode the communications data provided by DATA STREAM 2.

The PN coded timing sequence is provided to a modulator 68. The modulator 68 can be configured to modulate the PN coded carrier in any of a variety of ways. As an example, the PN coded carrier can be modulated via binary phase-shift keying (BPSK), quaternary phase-shift keying (QPSK), offset QPSK, or staggered QPSK (SQPSK). In addition, the modulator 68 can be configured to modulate the PN coded timing sequence orthogonal to the radar chirp signal. As a result, the resultant reflected coded signal can be discriminated with respect to the SAR pulsed signal at a respective radar receiver. The modulator 68 thus provides an output that is the coded signal to an amplifier 70, which thus provides the amplified coded signal to the summation component 64.

Figure 3:
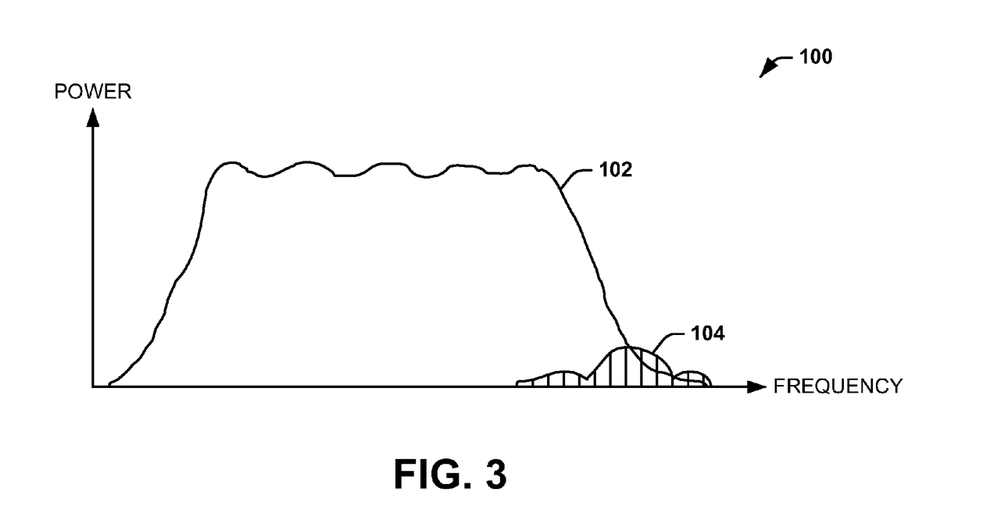
FIG. 3 illustrates an example of a power spectral density (PSD) graph of a SAR transmission system in accordance with an aspect of the invention.

As described above in the example of FIG. 1, the SAR pulsed signal 16 can be amplified at a significantly higher power level than the coded signal 28. FIG. 3 illustrates an example of a power spectral density (PSD) graph 100 of a SAR transmission system, such as the SAR transmission system 50 in the example of FIG. 2, in accordance with an aspect of the invention. The graph 100 plots power over a frequency range to demonstrate a PSD for each of the SAR pulsed signal 16 and the coded signal 28. Specifically, the graph 100 demonstrates a PSD 102 that corresponds to the SAR pulsed signal 16 and a separate PSD 104, demonstrated with PN code framing lines, that corresponds to the coded signal 28.

As demonstrated in the example of FIG. 3, the SAR pulsed signal 16 is generated at a significantly higher power level than the coded signal 28. Therefore, the SAR pulsed signal 16 can effectively mask the coded signal 28 at a receiver, such as belonging to an adversarial party. As a result, upon receiving a SAR pulsed signal 16, the coded signal 28 may appear as little more than noise and/or other interference to an adversarial receiver. Therefore, the possibility that the information in the coded signal 28 is compromised by an adversarial party is substantially mitigated, thus further contributing to the enhanced security of the radar system 10.

It is to be understood that the SAR pulsed signal 16 may not occupy the entire frequency range that is demonstrated by the PSD 102. Specifically, the PSD 102 may represent a range of possible frequencies for a given SAR pulsed signal 16. In addition, it is to be understood that the PSD 104 is not limited to occupying the portion of the frequency band demonstrated in the example of FIG. 3. As an example, the PSD 104 can occupy any portion of the frequency band also occupied by the PSD 102, or a frequency band that is separate from the PSD 102. Further, it is to be understood that the time-bandwidth product of the SAR pulsed signal 16 is, in general, less than the time-bandwidth product of the coded signal 28.

Referring back to the example of FIG. 2, the summation component 64 is configured to add the SAR pulsed signal and the coded signal together. The resultant summed signals are provided as the combination signal to an RF transmitter 72. The RF transmitter 72 is configured to up-convert the combination signal and to provide the combination signal to an antenna 74 for transmission to the target object 18. Therefore, the combination signal that is transmitted to the target object 18 includes both the SAR pulsed signal 16 and the coded signal 28 that are time-aligned relative to each other. In addition, as demonstrated in the example of FIG. 2, the hardware that is required to generate the coded signal 28 can be configured separate from the hardware required to generate the SAR pulsed signal 16. Accordingly, a legacy SAR transmitter can easily incorporate the additional hardware that is required to generate the coded signal 28, and thus the resultant combination signal. As such, a legacy SAR transmitter can be upgraded to be implemented as the SAR transmission system 50 at a relatively low cost.

It is to be understood that the SAR transmission system 50 is not intended to be limited to the example of FIG. 2. As an example, the components demonstrated for the generation and modulation of the signals have been greatly simplified in description for the sake of brevity. As such, the SAR transmission system 50 can include any of a variety of additional components necessary for the creation, modulation, and transmission of the SAR pulsed signal 16 and the coded signal 28. As a result, the SAR transmission system 50 can be configured in any of a variety of ways.

Figure 4:
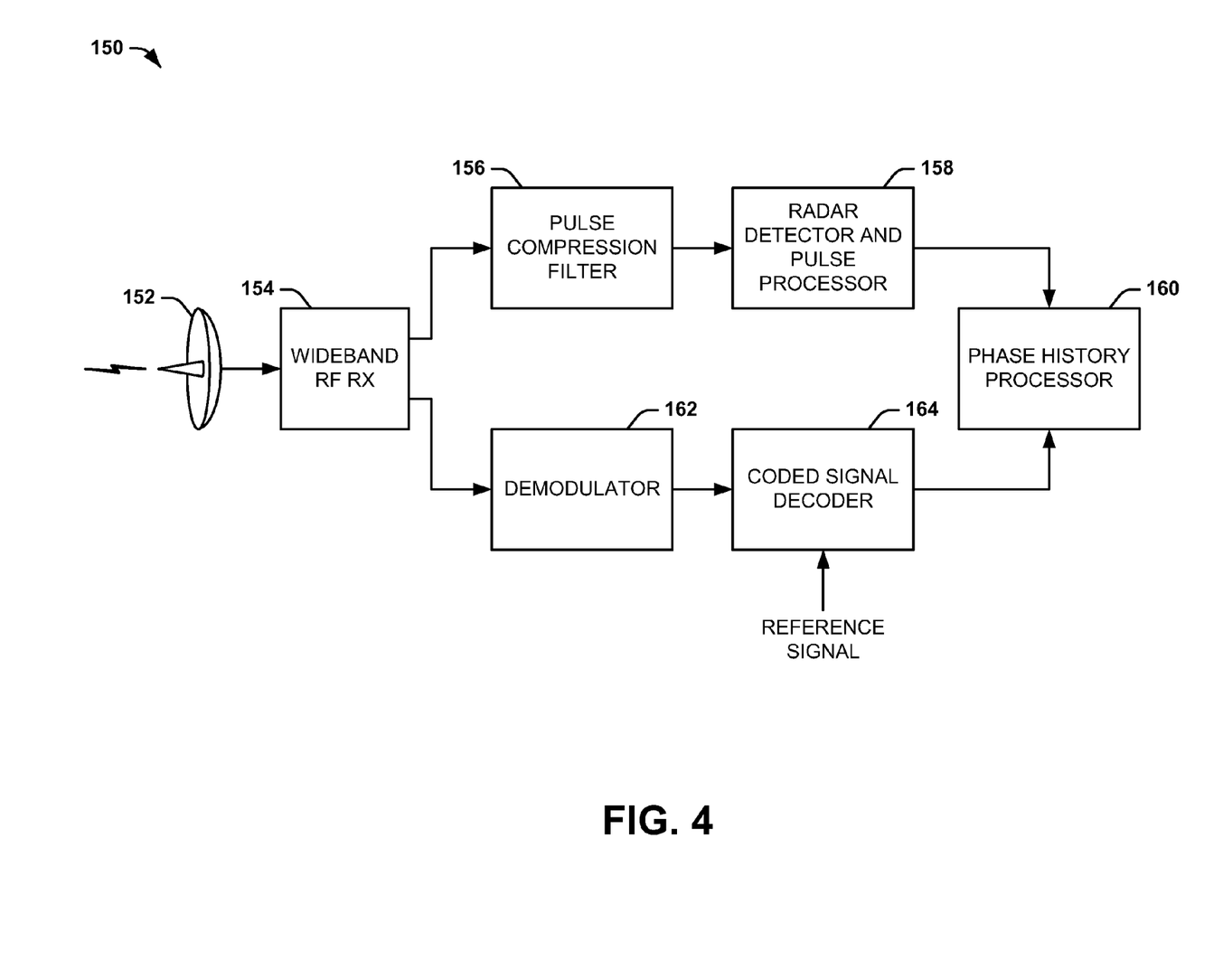
FIG. 4 illustrates an example of a SAR receiver system in accordance with an aspect of the invention.

FIG. 4 illustrates an example of a SAR receiver system 150 in accordance with an aspect of the invention. The SAR receiver system 150 can be implemented in one or more of the satellites 14 in the example of FIG. 1 to receive the reflected SAR pulsed signal 22 and coded signal 30. Therefore, reference will be made to the example of FIG. 1 in the following description of the example of FIG. 4.

The SAR receiver system 150 includes an antenna 152 that collects the energy of the reflected SAR pulsed signal 22 and the reflected coded signal 30. The reflected SAR pulsed signal 22 and coded signal 30 are provided to a wideband RF receiver 154. The wideband RF receiver 154 can be configured to downconvert the received RF signal that includes the reflected SAR pulsed signal 22 and coded signal 30 to an intermediate frequency (IF). In addition, the wideband RF receiver 154 can include one or more filters that are configured to essentially separate the frequency band that includes the reflected coded signal 30 from the rest of the reflected SAR pulsed signal 22. For example, the wideband RF receiver 154 can include a narrow-band filter to extract the reflected coded signal 30 frequency band. The resultant IF signal can be the reflected coded signal 30 having a very low signal-to-noise ratio (SNR) due to the content of the reflected SAR pulsed signal in the frequency band. As an example, the reflected coded signal 30, upon being received at the wideband RF receiver 154, can have a signal-to-noise plus interference ratio (SNIR) of less than approximately 0 dB.

The wideband RF receiver 154 can also include a zonal filter that is matched to the frequency range of the reflected SAR pulsed signal 22. For example, the filter can be configured as a surface acoustic wave (SAW) filter that is matched to the chirp rate and frequency of the reflected SAR pulsed signal 22. Therefore, the reflected SAR pulsed signal 22 can be isolated and provided to a pulse compression filter 156. The pulse compression filter 156 is configured to de-chirp the radar return signal from the incoming pulses that constitute the reflected SAR pulsed signal 22. As an example, the resultant de-chirped signal can thus be provided as a radar video signal to a radar detector and pulse processor 158. The radar detector and pulse processor 158 can be configured to phase demodulate the radar return signal and to extract the sequential code that is mixed with the radar return signal.

The de-chirped radar return signal is provided to a phase-history processor 160 that is configured to process the radar return signal to determine time-of-arrival and Doppler-shift measurements of the radar return signal. The phase-history of the radar return signal can be representative of the effects of the reflection of the SAR pulsed signal 16 from the target object 18, such that the phase-history can be determinative of the radar image of the target object 18. As an example, the key signal parameters can include received signal amplitude, time-of-arrival (e.g., relative to time-of-transmission), and Doppler-shift.

As described above, the wideband RF receiver 154 outputs a resultant IF signal that is the reflected coded signal 30 having a very low SNR due to the content of the reflected SAR pulsed signal in the frequency band. The resultant IF signal is provided to a demodulator 162 that is configured to demodulate the reflected coded signal 30. As an example, the demodulator 162 can be a spread-spectrum demodulator that is configured to de-spread the reflected coded signal 30. Because of the very low SNR of the reflected coded signal 30, the demodulator 162 can include a signal acquisition processor configured to discriminate the reflected coded signal 30 from the interference caused by the reflected SAR pulsed signal 22 in the frequency band of the reflected coded signal 30. One such example of signal acquisition processing to acquire a signal in a low SNR environment is described in U.S. Pat. No. 6,763,058, which is incorporated herein by reference in its entirety.

The demodulated reflected coded signal is provided to a coded signal decoder 164. The coded signal decoder 164 is configured to decode and acquire the timing sequence that is PN encoded within the demodulated reflected coded signal. The acquired timing sequence can be correlated with a reference signal that is substantially identical to the timing sequence. As an example, the reference signal and the timing sequence can be predetermined, such that the reference signal is stored in a memory (not shown) in the SAR receive system 150. As another example, the reference signal can be provided to the SAR receive system 150, such as through a separate RF transmission to the SAR receive system 150. Based on the correlation of the acquired timing sequence with the reference signal, as well as the time-alignment of the timing sequence with the sequential code of the SAR pulsed signal 16, the coded signal decoder 164 can ascertain very precise timing information associated with the SAR pulsed signal 16, such as time-of-arrival of the reflected SAR pulsed signal 22 at the SAR receive system 150 relative to transmission. Further, the signal acquisition processor, such as described in U.S. Pat. No. 6,763,058, can determine the precision Doppler-shift features associated with the de-spread carrier tone.

In addition, the demodulator 162 can be configured to analyze frequency information associated with the demodulated phase coded signal. As such, the demodulator 162 can determine frequency changes of the demodulated coded signal. As an example, due to the more highly correlative properties of a spread-spectrum signal, the de-spread coded signal can be highly indicative of frequency changes of the reflected coded signal 30. Therefore, the demodulator 162 can also be configured to more accurately determine a Doppler-shift associated with the reflected SAR pulsed signal 22. As a result, the time-of-arrival and Doppler-shift information of the reflected coded signal 30 that is ascertained by the demodulator 162 can substantially increase a time-bandwidth product associated with the reflected SAR pulsed signal 22.

The determined information associated with the time-of-arrival and Doppler-shift of the reflected SAR pulsed signal 22 is provided to the phase-history processor 160. As such, the determined information can be implemented by the phase-history processor to generate a more precise phase-history of the reflected SAR pulsed signal 22. The more precise phase-history of the reflected SAR pulsed signal 22 can thus, in turn, be implemented to generate a substantially more precise radar image of the target object 18. Furthermore, if systematic jitter or randomization is incorporated into the traditional linear FM chirp SAR component signal, the low-level coded spread-spectrum signal may also be used to establish the critical waveform time relationships at the SAR receive system 150 without being detectable to an adversary. The adversary can thus only derive critical signal processing functions from the observables associated with the jittered or randomized high level linear FM chirp signal. Errors in system performance assessment by the adversary could thus be expected.

It is to be understood that the SAR receive system 150 is not intended to be limited to the example of FIG. 4. As an example, the components demonstrated for the receipt, demodulation, and processing of the signals have been greatly simplified in description for the sake of brevity. As such, the SAR receive system 150 can include any of a variety of additional components necessary for the receipt, demodulation, and processing of the reflected SAR pulsed signal 22 and the reflected coded signal 30. For example, the SAR receive system 150 can be alternatively configured to include a pulse compression radar receiver that can be configured to employ chirped oscillators with opposite chirp direction and identical chirp rates as an input to a down-conversion mixer stage upstream of the phase-history processor. As a result, the SAR receive system 150 can be configured in any of a variety of ways.

Figure 5:
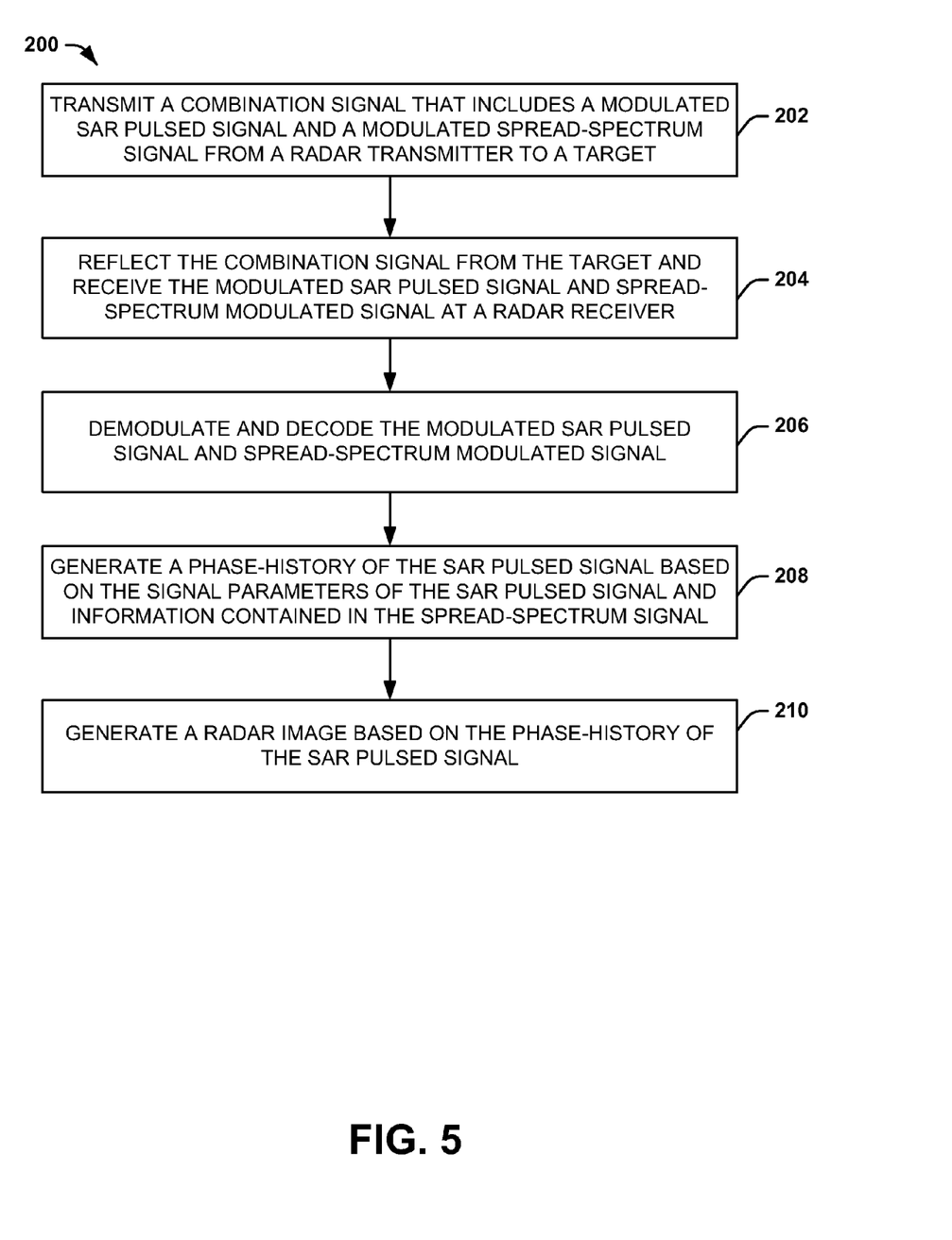
FIG. 5 illustrates an example of a method for generating a radar image of a target in a SAR system in accordance with an aspect of the invention.

In view of the foregoing structural and functional features described above, a methodology in accordance with various aspects of the present invention will be better appreciated with reference to FIG. 5. While, for purposes of simplicity of explanation, the methodologies of FIG. 5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for generating a radar image of a target in a SAR system in accordance with an aspect of the invention. The SAR system can be a bistatic or multistatic radar system. At 202, a combination signal that includes a modulated SAR pulsed signal and a spread-spectrum modulated signal is transmitted from a radar transmitter to the target. The transmitter can be surface located, or can be located on an aerospace vehicle, such as an aircraft or satellite. The target can be a target object, terrain feature, city, or any of a variety of other target objects for which a radar image is to be obtained.

The modulated SAR pulsed signal can be a linear FM chirp signal that is phase-modulated. The modulated SAR pulsed signal can include a sequential code, such as a Barker code, that defines a transmission sequence for the modulated SAR pulsed signal. The spread-spectrum modulated signal can be a signal that includes a PN encoded timing sequence, which can be time-aligned with the sequential code of the SAR pulsed signal. The spread-spectrum modulated signal can be transmitted at a substantially reduced power level relative to the SAR pulsed signal, and can be transmitted orthogonal to the modulated SAR pulsed signal. The spread-spectrum modulated signal and/or the modulated SAR pulsed signal can also include encoded communications data for transmission to an RF receiver.

At 204, the combination signal is reflected from the target and the modulated SAR pulsed signal and modulated spread-spectrum signal are received at a radar receiver. The SAR pulsed signal and combination signal within the reflected combination signal can be separated by frequency band at the radar receiver, such as by narrow band and/or matched filters. At 206, the modulated SAR pulsed signal and spread-spectrum modulated signal are demodulated and decoded. The spread-spectrum signal can occupy a frequency range that includes significant interference caused by the SAR pulsed signal, and thus can be demodulated based on low SNR demodulation techniques. At 208, a phase-history of the SAR pulsed signal can be generated based on signal parameters of the SAR pulsed signal and based on information contained within the spread-spectrum signal. The signal parameters can include time-of-arrival relative to transmission, return signal amplitude, and induced Doppler-shift. The information contained within the spread-spectrum signal can thus augment or increase the effective time-bandwidth product or pulse compression processing gain of the SAR pulsed signal. At 210, a radar image is generated based on the phase-history of the SAR pulsed signal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A synthetic aperture radar (SAR) system comprising:
   a radar transmitter configured to transmit a combined signal, the combined signal comprising a first signal that is a modulated SAR radar signal and a second signal that is a modulated signal;
   at least one radar receiver configured to receive a reflected combined signal that comprises a reflected first signal and a reflected second signal, the reflected first and second signals corresponding to the first and second signals having been reflected from a target, and to demodulate the reflected first and second signals; and
   a radar image processor configured to generate a radar image of the target based on signal parameters associated with the reflected first signal and based on information comprised within the reflected second signal.

2. The system of claim 1, wherein the radar system is configured as one of a bistatic SAR system and a multistatic SAR system.

3. The system of claim 1, wherein the first signal is a linear frequency modulated (FM) chirp signal and the second signal is a spread-spectrum modulated signal.

4. The system of claim 1, wherein the radar transmitter comprises a first amplifier configured to amplify the first signal at a first power level and a second amplifier configured to amplify the second signal at a second power level, the first power level being substantially greater than the second power level, and wherein the first signal and the second signal are modulated orthogonally relative to each other.

5. The system of claim 1, wherein second signal comprises coded communications data in addition to the information comprised within the second signal for transmission of the communications data to at least one RF receiver.

6. The system of claim 1, wherein the first signal comprises a sequential code that defines a transmission sequence of the first signal, and wherein the second signal comprises a pseudo-noise (PN) coded timing sequence that is aligned with the sequential code at the transmitter in a predetermined manner to increase a time-bandwidth product associated with the signal parameters of the reflected first signal at the at least one radar receiver to generate the radar image of the target.

7. The system of claim 6, wherein the time-bandwidth product associated with the signal parameters enables a precise measurement of a time-of-arrival of the reflected first signal at the at least one receiver and a Doppler-shift associated with the reflected first signal.

8. The system of claim 7, wherein the at least one radar receiver is configured to compare the timing sequence with a substantially identical timing sequence of a reference signal to determine the precise time-of-arrival of the reflected first signal.

9. The system of claim 7, wherein the at least one radar receiver is configured to demodulate the reflected second signal and to evaluate a Doppler-shift associated with the reflected second signal to determine the Doppler-shift associated with the reflected first signal.

10. The system of claim 6, wherein the sequential code is a Barker code that comprises coded communications data in addition to defining the transmission sequence of the first signal for transmission of the communications data to at least one RF receiver.

11. A method for generating a radar image of a target in a synthetic aperture radar (SAR) system, the method comprising:
   transmitting a combined signal from a transmitter to the target, the combined signal comprising a first signal that is a modulated SAR radar signal and a second signal that is a spread-spectrum modulated signal;
   receiving a reflected combined signal at each of at least one radar receiver, the reflected combined signal comprising a reflected first signal and a reflected second signal, the reflected first and second signals corresponding to the first and second signals having been reflected from the target;
   demodulating the reflected first and second signals at the at least one radar receiver; and generating a radar image of the target based on signal parameters associated with the reflected first signal and based on information comprised within the reflected second signal.

12. The method of claim 11, further comprising:
amplifying the first signal to a first power level;
amplifying the second signal to a second power level, the first power level being substantially greater than the second power level; and
modulating the second signal orthogonally relative to the first signal.

13. The method of claim 11, further comprising:
encoding communications data into the second signal; and
transmitting the combined signal to at least one RF receiver.

14. The method of claim 11, further comprising:
encoding the first signal with a sequential code that defines a transmission sequence of the first signal;
encoding the second signal with a pseudo-noise (PN) coded timing sequence that defines a transmission sequence of the second signal;
aligning the sequential code with the PN coded timing sequence at the transmitter in a predetermined manner; and
comparing the timing sequence of the reflected second signal with a substantially identical timing sequence of a reference signal to determine the precise time-of-arrival of the first signal based on the sequential code.

15. The method of claim 14, wherein encoding the first signal comprises encoding the first signal with a sequential Barker code, the method further comprising:
encoding communications data in the sequential Barker code; and
transmitting the first and second signals to at least one RF receiver.

16. The method of claim 11, further comprising comparing a Doppler-shift associated with the reflected second signal to determine the Doppler-shift associated with the reflected first signal at the at least one radar receiver.

17. A synthetic aperture radar (SAR) system comprising:
means for generating a first signal that is a modulated SAR radar signal;
means for generating a second signal that is a spread-spectrum modulated signal, the second signal being orthogonal to the first signal;
means for amplifying the first signal to a first power level;
means for amplifying the second signal to a second power level that is substantially less than the first power level;
means for transmitting a combined signal comprising the first and second signals;
means for receiving a reflected combined signal that comprises a reflected first signal and a reflected second signal, the reflected first and second signals corresponding to the first and second signals having been reflected from a target;
means for demodulating the reflected first signal;
means for demodulating the reflected second signal;
means for processing a phase-history of the reflected first signal based on signal parameters associated with the first signal and based on information comprised within the second signal; and
means for generating a radar image of the target based on the phase-history of the reflected first signal.

18. The system of claim 17, wherein the means for generating the second signal comprises means for encoding communications data in addition to the information comprised within the second signal for transmission of the communications data to at least one RF receiver.

19. The system of claim 17, wherein the means for generating the first signal comprises encoding the first signal with a sequential code that defines a transmission sequence of the first signal, and wherein the means for generating the second signal comprises means for pseudo-noise (PN) encoding a timing sequence, the sequential code and the timing sequence being time-aligned for transmission of the first signal and the second signal.

20. The system of claim 19, wherein the means for processing is further configured to compare the timing sequence with a substantially identical timing sequence of a reference signal to determine the precise time-of-arrival of the reflected first signal.

21. The system of claim 17, wherein the means for processing is further configured to evaluate a Doppler-shift associated with the reflected second signal to determine the Doppler-shift associated with the reflected first signal.

22. The system of claim 17, wherein a signal-to-noise plus interference ratio (SNIR) of the reflected second signal is below approximately 0 dB.

* * * * *